United States Patent [19]

Kigawa et al.

[11] Patent Number: 5,323,522
[45] Date of Patent: Jun. 28, 1994

[54] METHOD FOR EXCHANGING SEAL FOR SHOCK ABSORBING APPARATUS

[75] Inventors: Kazuya Kigawa, Yokohama; Kenji Furukawa, Kasugai; Tetsu Deguchi, Nagareyama; Sachiharu Inoue, Sakura; Norikatsu Endo, Ikeda; Tatsuo Yanagisawa, Toyonaka; Shinji Ikegami, Abiko; Yasuyuki Omagari; Koji Kihara, both of Yokohama; Tachiki Sugawara, Tokyo; Kenzo Shimizu, Ghitose, all of Japan

[73] Assignee: All Nippon Airways, Co., Ltd., Tokyo, Japan

[21] Appl. No.: 948,321

[22] Filed: Sep. 22, 1992

[30] Foreign Application Priority Data

Sep. 27, 1991 [JP] Japan ................ 3-07834[U]
Sep. 27, 1991 [JP] Japan ................ 3-248817

[51] Int. Cl.$^5$ .............................. B23P 6/00
[52] U.S. Cl. .................. 29/402.02; 29/402.03; 29/402.08; 29/426.4
[58] Field of Search .......... 29/402.01, 402.02, 402.03, 29/402.08, 426.1, 426.4

[56] References Cited

U.S. PATENT DOCUMENTS 3,183,585 5/1965 West ........................ 29/402.08
3,764,105 10/1973 Ducuing .
3,889,904 6/1975 Jones et al. .

FOREIGN PATENT DOCUMENTS 2145411 8/1972 Fed. Rep. of Germany .

Primary Examiner—Mark Rosenbaum
Assistant Examiner—David P. Bryant
Attorney, Agent, or Firm—Shapiro and Shapiro

[57] ABSTRACT

To safety and quickly exchange a seal of a shock strut of a selected shock absorbing apparatus of an airplane, the main body of the airplane is lifted by pressurizing and extending at least one other shock absorbing apparatus in order to extend the selected shock absorbing apparatus and expose the seal thereof. A shock strut of the selected shock absorbing apparatus is then lifted away from the associated wheels so that a new seal may be inserted from below the strut.

5 Claims, 4 Drawing Sheets 5,323,522

METHOD FOR EXCHANGING SEAL FOR SHOCK ABSORBING APPARATUS

BACKGROUND OF THE INVENTION

1. Field of the Invention

The invention relates to method and apparatus for exchanging a seal of a shock absorbing apparatus of a heavy moving object, particularly, an airplane.

2. Related Background Art

Generally, in an airplane, a shock absorbing apparatus called a shock strut is provided between the wheels and the body or wing portion in order to reduce shocks which are received upon landing and in the movement by wheels. The shock strut has an expandable elongated pillar shape having therein a cylinder and a piston. A gas and an oil are filled in the shock strut and a shock is reduced by a cooperating function thereof. Therefore, an O-ring type seal to seal the oil is provided for the shock strut. Such a seal must be exchanged when an oil leakage occurs.

A method of exchanging the seal of the shock strut which has conventionally been used will now be briefly explained with reference to FIG. 4. FIG. 4 is a diagram showing the exchanging work of the seal of the shock strut according to the conventional technique. In FIG. 4, shock struts 3 are coupled between a wing portion 1a and a body 1 of an airplane and wheels 2. As will be explained hereinafter, since the seal of the shock strut 3 is arranged between the cylinder and piston of the shock strut 3, the seal is exposed to the outside by extending the shock strut. Since the seal is the O-ring type seal, in order to exchange the seal, the wheels 2 and the shock strut 3 are disconnected and, after that, a new seal must be inserted from a gap between them. Consequently, as shown in FIG. 4, a plurality of large jacks 40 are installed below the body 1 and wing portion 1a of the airplane and the whole airplane is lifted up by the large jacks 40, thereby exposing the seals in the shock struts 3.

With such a conventional method, however, it takes time to install the large jacks 40, an advanced technique is required to lift up the airplane by the large jacks 40 while maintaining the airplane in the horizontal state, the jacks are deviated unless the certain supporting positions of the jacks are selected, and a long time and much labor are needed. There is also a problem regarding safety. In order to attach the O-ring type seal to the shock strut 3, it is necessary to elevate the shock strut and to insert the seal from the lower position. Therefore, hitherto, when the seal is exchanged, the shock strut is hung from the upper position by a rope or the like and the seal must be attached to a predetermined position from the lower position of the shock strut while going over the rope which hangs the shock strut, so that much labor is required. The leg portion of the shock strut has a slant surface which faces downward and it is undesirable to support the leg portion by the jack or the like from viewpoints of instability and safety of the procedure.

All airfields do not have the facilities such as large jacks. It is desirable, however, that the seals can be easily exchanged as necessary at any place.

SUMMARY OF THE INVENTION

It is an object of the invention to provide apparatus and a method whereby seals can easily, safely, and quickly be exchanged.

According to one aspect of the invention, there is provided an apparatus for exchanging an O-ring type seal for a shock absorbing apparatus having a slant surface which faces downward and also having an attaching hole in a surface which intersects the slant surface. The exchanging apparatus comprises a substantially trapezoidal main body having a slant surface; a cylindrical portion provided toward the bottom of the slant surface and extended in a direction across the slant surface; a plate to couple the main body and one end of the cylindrical portion; and a pin portion which is projected out from a lower surface of the main body. An outer diameter of the cylindrical portion is almost equal to an inner diameter of the attaching hole of the shock absorbing apparatus, and the inclination of the slant surface is equal to the inclination of the slant surface of the shock absorbing apparatus. In use of the invention, the cylindrical portion is inserted into the attaching hole, the slant surface is brought into contact with the slant surface of the shock absorbing apparatus, so that the cylindrical portion is attached to the shock absorbing apparatus, and by lifting up the pin portion, the shock absorbing apparatus ascends while being held.

According to a further aspect of the invention, there is provided a method of exchanging an O-ring type seal provided in a shock absorbing apparatus of a body which is coupled to wheels through a plurality of shock absorbing apparatuses, wherein each of the shock absorbing apparatuses comprises a cylinder and a piston, one of the cylinder and the piston is coupled to the body, the other one is coupled to the wheels, and shock forces which are transferred from the wheels to the body are reduced by using a fluid filled in a space between the cylinder and the piston. The exchanging method comprises the steps of: filling gas into the shock absorbing apparatuses other than the shock absorbing apparatus having the seal to be exchanged to cause the relative movements of the cylinders and the pistons and extend the shock absorbing apparatuses, thereby exposing the seal of the shock absorbing apparatus having the seal to be exchanged; removing the exposed seal; separating the shock absorbing apparatus having the seal to be exchanged away from the wheels; inserting a new seal from a lower portion of the shock absorbing apparatus separated from the wheels; and attaching the inserted seal at a predetermined position.

According to yet another aspect of the invention an apparatus which is used in the seal exchanging method according to the invention comprises: pressurizing means for sending gas with a pressure; and distributing means for coupling the pressurizing means and a plurality of shock absorbing apparatuses, for transferring the gas sent with a pressure from the pressurizing means to the shock absorbing apparatuses, wherein the distributing means comprises pressure gauge means for detecting a pressure of the gas which is sent with a pressure to each shock absorbing apparatus, valve means for stopping the supplying operation of the gas with a pressure to each shock absorbing apparatus, and drain means for releasing the gas filled in each shock absorbing apparatus.

According to the invention, since the airplane body is lifted up by using the shock absorbing apparatuses of the airplane in place of the large jacks, there is no need to install the large jacks, the workers need not be concerned about the selection of the installing locations of the large jacks or the like, and the seal can be safely and easily exchanged.

DETAILED DESCRIPTION OF THE PREFERRED EMBODIMENTS

An embodiment of the invention will be described hereinbelow with reference to the drawings. A word "gas" which is used in the description of the embodiment denotes air or inorganic gas (for instance, $N_2$ gas).

Figure 1:
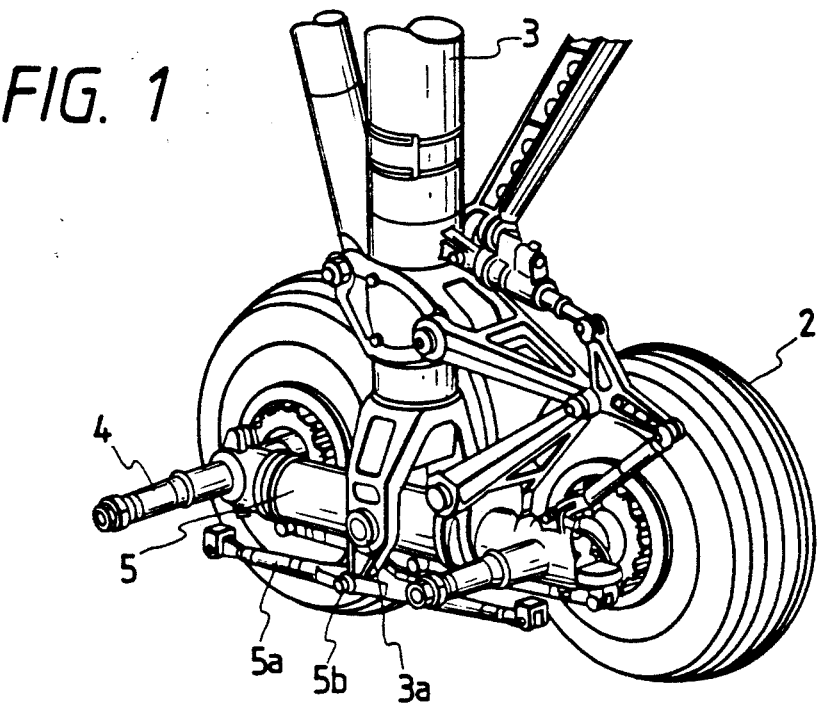
FIG. 1 is a perspective view around one leg portion of a certain type of airplane.

FIG. 1 is a perspective view around one leg portion of a certain type of airplane. For easy understanding of the construction, FIG. 1 shows only two wheels although there are generally four wheels. The wheels 2 attached to an axle 4 are coupled to the front and back positions by a track beam 5. Although not shown, an upper portion of the shock strut 3 which vertically extends is attached to the airplane body. Further, a lower portion of the shock strut 3 is attached to a rod 5a and the track beam 5 by a pin 5b and a pin portion 3a.

Figure 2:
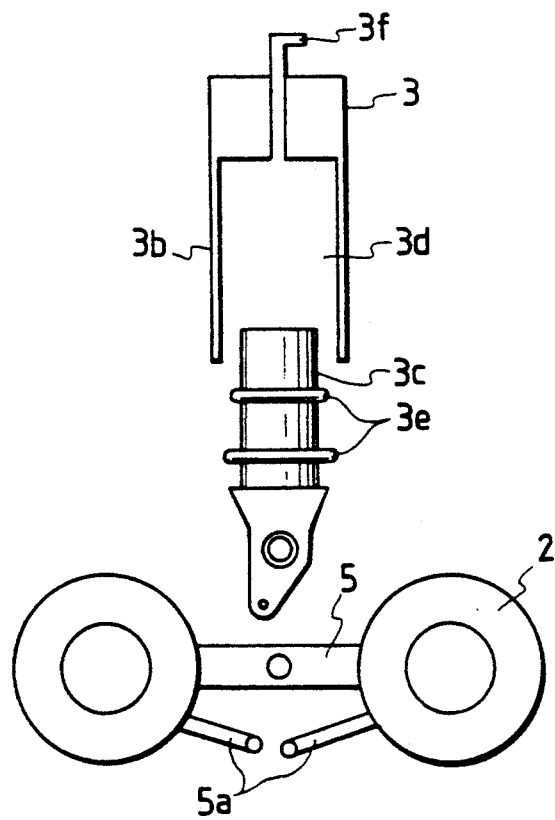
FIG. 2 is a diagram showing a state in which a shock strut 3 is lifted up and a track beam 5 is disconnected.

A structure of the shock strut 3 will now be briefly explained. FIG. 2 is a diagram showing a state in which the shock strut 3 is lifted up and is disconnected from the track beam 5. A part of the shock strut is shown as a cross sectional view. In FIG. 2, the shock strut 3 comprises a cylinder portion 3b and a piston portion 3c. In the ordinary using state, the piston portion 3c is inserted into the cylinder portion 3b. Gas and oil are filled in a space 3d which is formed by the cylinder portion 3b and the piston portion 3c. The gas in the space 3d functions as a spring. The oil in the space 3d functions as a damper. A shock which the wheels receive in the landing or the like is reduced by the cooperation of the gas and the oil, thereby preventing the shock from being directly transferred to the airplane main body. An oleo seal 3e is an O-ring type seal and seals the inner periphery of the cylinder portion 3b and the outer periphery of the piston portion 3c thereby preventing the oil in the space 3d from leaking to the outside. A gas port 3f is attached to a top portion of the cylinder portion 3b. The gas can be freely filled in or discharged from the cylinder portion 3b through the gas port 3f. The construction of the shock strut is well known.

Figure 3:
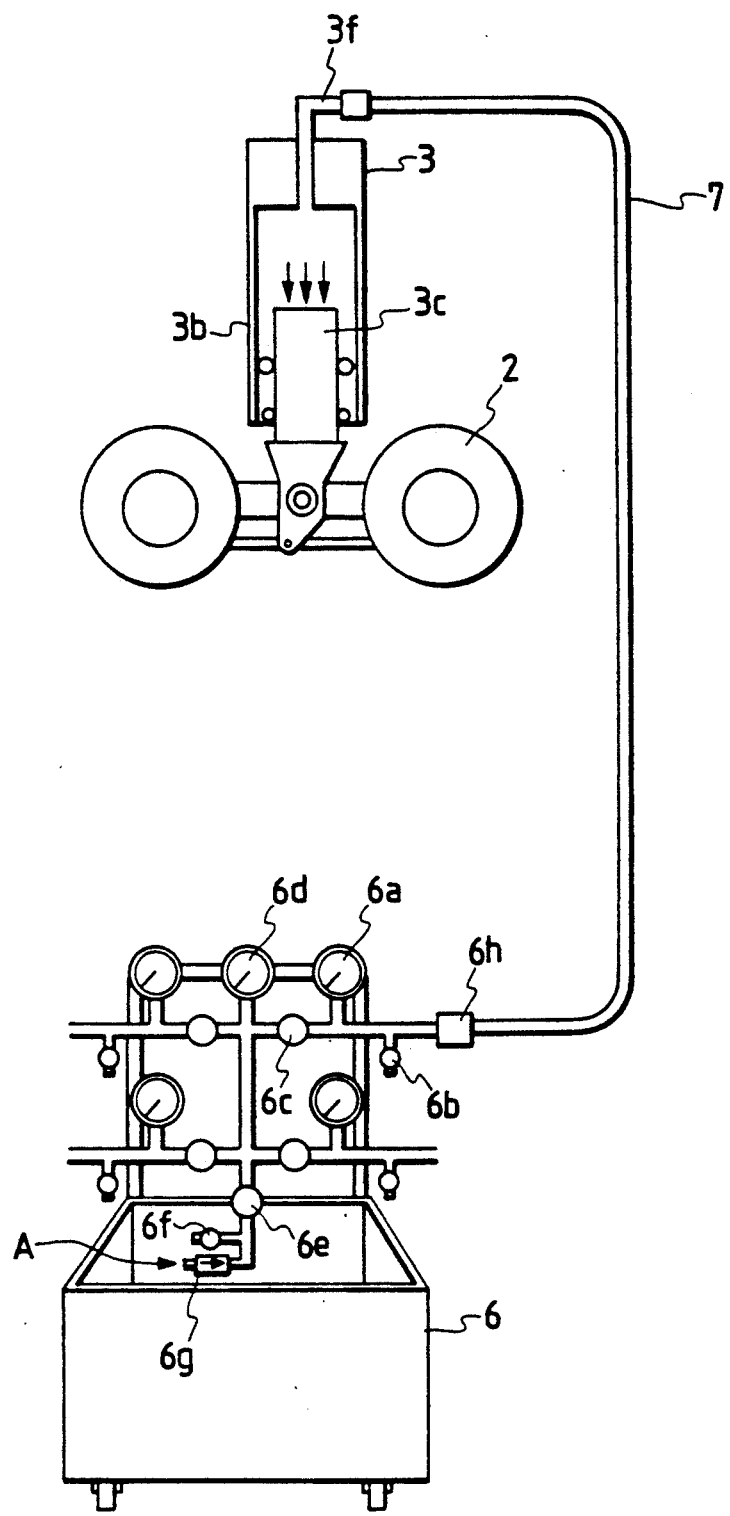
FIG. 3 is a diagram showing a distributing apparatus to fill a gas into the shock strut 3.
Figure 4:
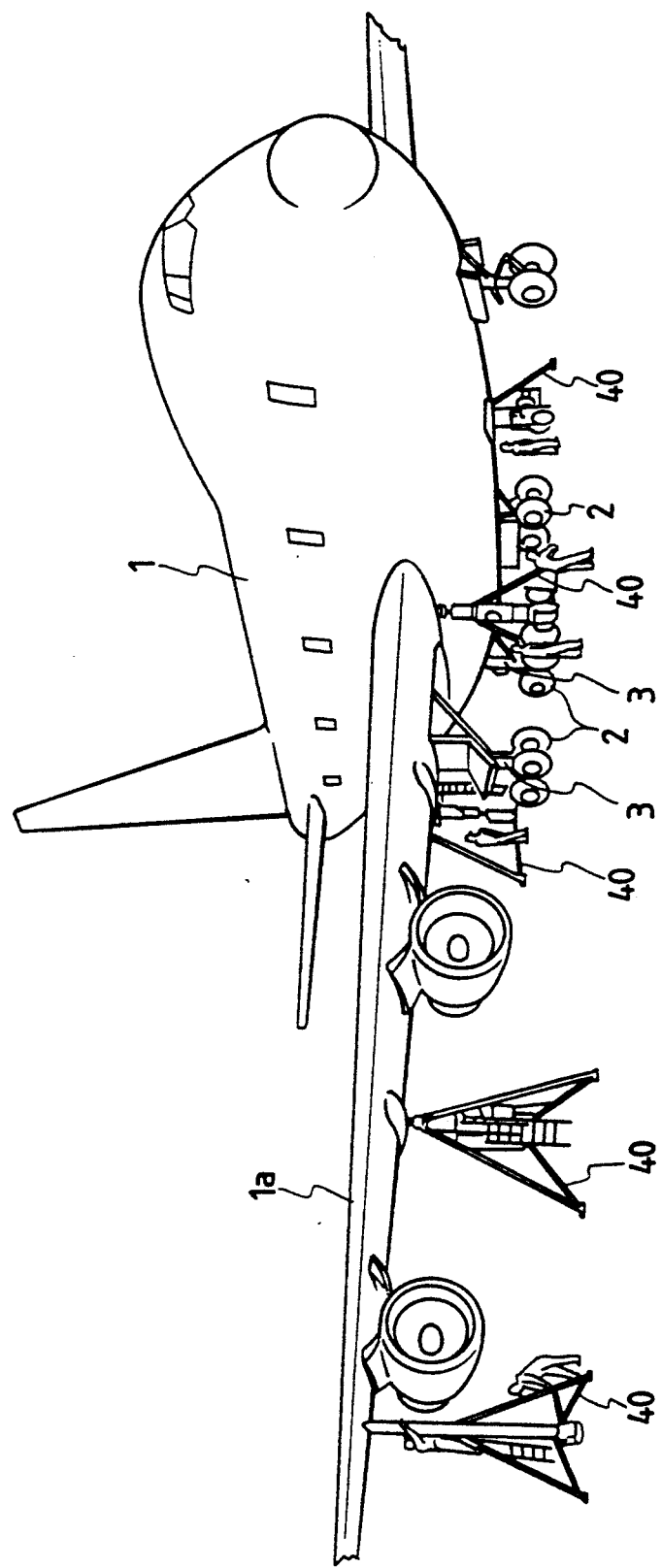
FIG. 4 is a diagram showing an exchanging work of a seal of a shock strut according to the conventional technique.

An apparatus for filling the gas into the shock strut 3 will be further described. FIG. 3 is a diagram showing a distributing apparatus for filling the gas into the shock strut 3. In a certain type of airplane, five leg portions are provided and the seal of one of the five shock struts is exchanged, so that the remaining four leg portions can be used upon exchange of the seal for a purpose which will be explained hereinafter. Therefore, a distribution apparatus 6 shown in FIG. 3 has one gas inlet 6g and four gas outlets 6h. Actually, four gas outlets should be respectively connected to four shock struts. In FIG. 4, however, in order to simplify the explanation and because all of them have a common construction, FIG. 4 shows a state in which only one gas outlet 6h is coupled to the shock strut 3.

The gas inlet 6g of the distributing apparatus 6 is connected to pressurizing means, that is, a compressor (not shown). The gas inlet 6g is connected to the gas outlet 6h through a main valve 6e and a subvalve 6c. The gas outlet 6h is connected to the gas port 3f of the shock strut 3 through a hose 7.

A bypass is provided between the gas inlet 6g and the main valve 6e. A main drain valve 6f is provided at a front end of the bypass. The main valve 6e can be freely opened or closed. When the main valve 6e is opened, the gas from the compressor can pass to the subvalve 6c. When the main valve 6e is closed, the passage of the gas from the compressor to the subvalve 6c is blocked. A main pressure gauge 6d is arranged between the main valve 6e and the subvalve 6c. A pressure of the gas which is supplied from the compressor is measured by the main pressure gauge 6d.

A bypass is provided between the subvalve 6c and the gas outlet 6h. A subdrain valve 6b is provided at a front end of the bypass. The subvalve 6c can be freely opened or closed. When the subvalve 6c is opened, the gas which passes through the main valve 6e can pass to the gas outlet 6h side. When the subvalve 6c is closed, the passage of the gas which passes through the main valve 6e to the gas outlet 6h side is individually blocked. When the subvalve 6c is closed and the subdrain valve 6b is opened, the gas in the shock strut 3 is individually released into the atmosphere through the gas outlet 6h. A subpressure gauge 6a is provided between the subvalve 6c and the gas outlet 6h. A pressure of the gas in the shock strut 3 is individually measured by the subpressure gauge 6a.

Although the shock strut 3 inherently functions as a shock absorber by the gas filled therein, by supplying the gas at a pressure higher than the pressure that is ordinarily used, the gas presses the piston portion 3c, so that the shock strut itself can be extended to a length longer than the ordinary length.

Further, a procedure to exchange the seal of the shock strut 3 will now be described hereinbelow with reference to FIGS. 2 and 3. First, referring to FIG. 3, the distributing apparatus 6 is coupled through the hose 7 to the shock struts 3 other than the shock strut whose seal should be exchanged. To simplify the description, FIG. 3 shows a state in which the distributing apparatus 6 is connected to only one shock strut as mentioned above. It is now assumed that the gas has been supplied with a pressure from the compressor (not shown) in the direction indicated by an arrow A. Although each subvalve 6c is opened, the main valve 6e is closed.

In a certain type of airplane, on the other hand, one leg portion is provided at a front position of the body, two leg portions are provided in parallel at rear positions of the body, and one leg portion is provided under each of the right and left wing portions. Total five leg portions are consequently provided. In this case, for example, when exchanging the seal of the shock strut of the leg portion of the wing portion, it is sufficient to extend only two leg portions provided at rear positions of the body and there is no need to extend the leg portion at the front position of the body. This is because when the shock struts of two leg portions provided at the rear positions of the body are extended, the rear portion of the body of the airplane is lifted up as if the airplane bows its nose, so that the shock strut of the leg portion of the wing portion as a target of the exchanging work is also extended and the seal is eventually exposed. In such a case, accordingly, it is sufficient to connect the hose 7 to two shock struts. In this case, to assure stability of the airplane body, the leg portion of the wing portion on the side opposite to the target leg portion of the exchanging work must not be extended.

On the other hand, when either one of the leg portions at the rear positions of the body is used as a target for the exchanging work, it is necessary to extend a total of three leg portions namely, the leg portions of the right and left wing portions; and the remaining leg portion at the rear position of the body. In such a case, therefore, the hose 7 is connected to those three shock struts.

When the main valve 6e is opened from such a state, the gas which has been supplied from the compressor with a pressure is uniformly transferred to two or three shock struts 3. The transferred gas depresses the piston portions 3c of the shock struts 3, thereby simultaneously extending two or three shock struts 3. Together with the extension of the shock struts 3, the body of the airplane is lifted up. When the main valve 6e is closed at a time point at which the body has been lifted up to a predetermined position, the pressure-feeding of the gas is stopped and the elevation of the body is also stopped. In the case where degrees of extension of the shock struts 3 are different and the body is not held horizontally with respect to the right and left directions because of an unbalanced distribution of the weight of the body, by opening the subdrain valve 6b, the gas in the shock struts 3 is released into the atmosphere, thereby individually contracting the shock struts so that the body is held in the horizontal state. So long as a strong wind (about 15 knots or more) doesn't blow, the body is stably held even by properly extending the two or three shock struts as mentioned above. However, auxiliary jacks can be also used as necessary. In such a case, there is no need to extend all of the shock struts and it is sufficient to extend only the shock strut arranged at the position opposite to the position of the auxiliary jack.

Figure 5:
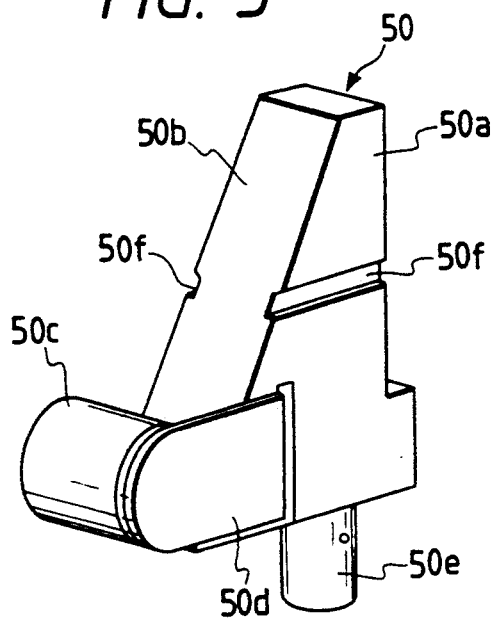
FIG. 5 is a perspective view of a seal exchanging apparatus of the invention.
Figure 6:
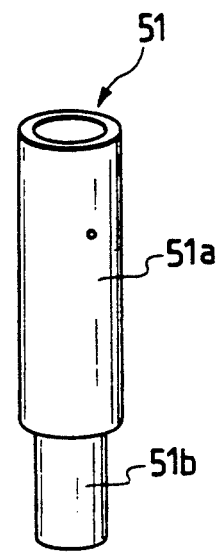
FIG. 6 is a perspective view of an extension adapter which is attached to the seal exchanging apparatus.
Figure 7:
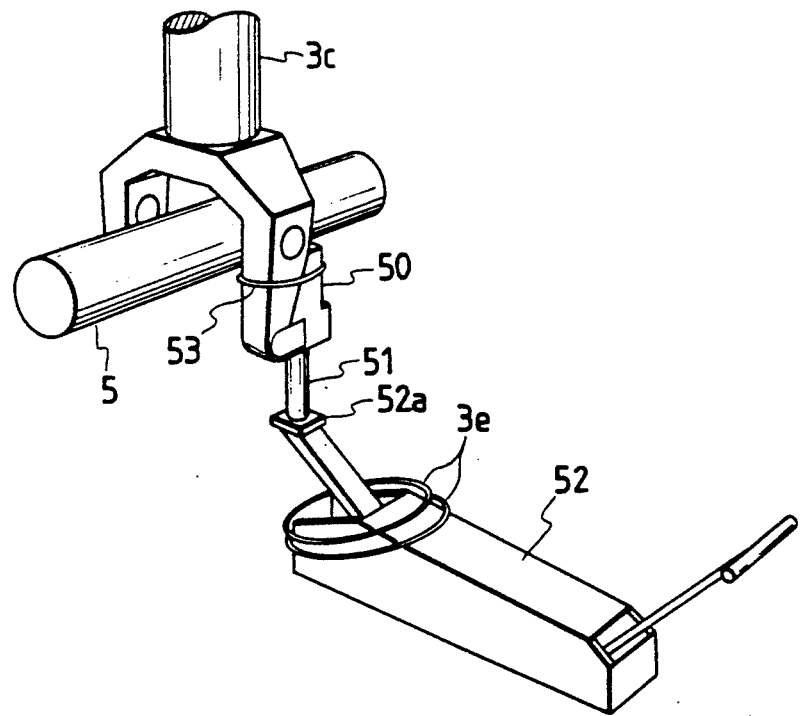
FIG. 7 is a diagram showing a state in which a piston portion 3c of a shock strut is lifted up by using a seal exchanging apparatus 50 in order to exchange a seal.

FIG. 2 shows a state of the shock strut whose seal should be exchanged in a state in which the shock struts are extended and the airplane body is lifted up. Although the cylinder portion 3b and the piston portion 3c relatively move in such directions as to be away from each other, they are not completely separated from each other but are set to a state in which two seals are exposed. In the illustrative state, the piston portion 3c is disconnected from the rod 5a and the track beam 5 at pin 5b and pin portion 3a, and the piston portion is lifted up, such as by a rope or other suitable means. FIGS. 5–7 show an apparatus, to be described later, for lifting the piston portion. The used seal can be cut out by a cutter or the like or can be also pulled out from the lower portion of the piston portion 3c. After the used seal has been removed, a new seal is inserted from the lower portion of the piston portion 3c so as to pass along the piston portion 3c and is moved to a predetermined position. After that, the piston portion 3c is descended and the track beam 5 and the rod 5a are coupled by the pin portion 3a and the pin 5b.

Referring again to FIG. 3, when the main drain valve 6f of the distributing apparatus 6 is opened in a state in which the above operations are finished, all gas in the shock struts 3 connected to the hose 7 is released into the atmosphere, so that the airplane body descends. When the pressure of the gas in the shock struts 3 is set to a proper pressure while monitoring the subpressure gauge 6a, the main drain valve 6f is closed. It is sufficient to finely adjust the pressure in each shock strut 3 by respectively opening or closing the subvalve 6c and subdrain valve 6b. The gas port 3f is closed at a time point of the completion of the fine adjustment and the distributing apparatus 6 is disconnected from the shock struts 3. In this manner, the seal exchanging operations are finished. Although certain preferred features of the invention have been described above with reference to the drawings, the invention is not limited thereto; and many variations and modifications are possible in keeping with the spirit and principles of the invention, the scope of which is defined in the appended claims. For instance, the number of gas outlets of the distributing apparatus 6 is not limited to four but can be also set to an arbitrary number. On the other hand, in consideration of a point that the holding stability of the airplane body deteriorates with an increase in strength of the wind, it is also possible to construct the apparatus 6 in a manner such that an anemometer is provided and when the wind velocity is equal to 15 knots or more, an alarm is generated. In addition, by interlocking the alarm with an electromagnetic valve, the pressure-feeding of the gas from the compressor may be stopped simultaneously with the generation of the alarm.

According to the present invention as described in detail above, since the shock absorbing apparatuses of the airplane are used in place of the large jacks to lift up the airplane body, there is no need to install the large jacks. In addition, maintenance workers need not be concerned about the installing locations of the large jacks or the like. The seal can be safely and easily exchanged.

Referring to FIGS. 5, 6 and 7, a seal exchanging apparatus of the invention will now be described. FIG. 5 is a perspective view of the seal exchanging apparatus of the invention. FIG. 6 is a perspective view of an extension adapter as a coupling member which is attached to the seal exchanging apparatus.

In FIG. 5, a seal exchanging apparatus 30 comprises a substantially trapezoidal main body 50a; a cylindrical portion 50c which extends under a side portion slant surface 50b of the main body 50a in a direction across the slant surface; a plate 50d to couple the main body 50a and the cylindrical portion 50a; and a pin portion 50e which is projected out from a lower surface of the main body 50a. These component elements are integrally attached by welding or the like. A groove portion 50f which extends horizontally is formed in each of central portions of the front and back surfaces of the main body 50a. An outer diameter of the cylindrical portion 50c is almost equal to the inner diameter of the rod attaching hole of the piston portion 3c of the shock strut 3.

In FIG. 6, an extension adapter 51 is formed by coaxially coupling a pipe portion 51a and a cylindrical portion 51b. An inner diameter of the pipe portion 51a is almost equal to the outer diameter of the pin portion 50e of the seal exchanging apparatus 50. The pin portion 50e can be freely fitted into the pipe portion 51a. Outer diameters of the cylindrical portion 51b and pin portion 50e are almost equal to an inner diameter of a hole (not shown) formed on a supporting surface 52a of an alligator jack 52 shown in FIG. 7.

FIG. 7 is a diagram showing a state in which the apparatus 50 is used to lift the piston portion 3c of the shock strut in order to exchange the seal. To obtain such a state, the seal exchanging apparatus 50 is first coupled to the extension adapter 51, the cylindrical portion 50c of the seal exchanging apparatus 50 which is supported by the alligator jack 52 is further inserted into the rod attaching hole of the piston portion 3c, and the slant surface 50b is brought into contact with the side portion of the leg portion of the piston portion 3c. As shown in the diagram, the new seal 3e is previously allowed to pass over the supporting surface 52a of the alligator jack 52 and is set below the supporting surface 52a. In this state, the extension adapter 51 is put onto the supporting surface 52a of the alligator jack 52, the jack is made operative, and the piston portion 3c is lifted up from the track beam 5. The groove portions 50f of the seal exchanging apparatus 50 are used when the seal exchanging apparatus 50 is bound to the piston portion 3c by a wire 53 or the like as shown in FIG. 7, thereby preventing the seal exchanging apparatus from unexpectedly falling off when the piston 3c is elevated. As will be obviously understood from FIG. 7, a thickness of the seal exchanging apparatus 50 is almost equal to the thickness of the leg portion of the piston portion 3c, thereby preventing the seal exchanging apparatus from interfering with the track beam 5 when the piston portion 3c is lifted up.

The used seal can be also previously cut out by a cutter or the like. Or, at this stage, the used seal may be also pulled out from the lower portion of the piston portion 3c. After the used seal is removed, the new seal 3e is allowed to pass from the alligator jack 52 over the seal exchanging apparatus 50 and the leg portion of the piston portion 3c and is moved to a predetermined position. Of course, since the seal 3e is made of a rubber, it can be extended to a certain degree. After that, the alligator jack 52 is made operative and the piston portion 3c is dropped down. Then the track beam 5 and the rod 5a are coupled through the pin portion 3a and the pin 5b.

Referring again to FIG. 3, in a state after completion of the above procedure, when the main drain valve 6f of the distributing apparatus 6 is opened, all gas in the shock struts 3 coupled to the hose 7 is released into the atmosphere and the airplane body descends. When the pressure of the gas in the shock struts 3 is set to a proper pressure while monitoring the subpressure gauge 6a, the main drain valve 6f is closed. It is sufficient to finely adjust the pressure in each shock strut 3 by respectively opening or closing the subvalve 6c and the subdrain valve 6b. The gas port 3f is closed at a time point of the completion of the fine adjustment and the distributing apparatus 6 is disconnected from the shock strut 3. The seal exchanging procedure is finished as mentioned above.

According to the apparatus for exchanging the seal for the shock absorbing apparatus of the invention described in detail above, the outer diameter of the cylindrical portion is almost equal to the inner diameter of the attaching hole of the shock absorbing apparatus and the inclination of the slant surface is equal to the inclination of the reverse slant surface. Therefore, when the cylindrical portion is inserted into the attaching hole and the slant surface is brought into contact with the reverse slant surface, the cylindrical portion is certainly attached to the shock absorbing apparatus. By elevating the pin portion, the shock absorbing apparatus is lifted up while being held.

What is claimed is:

1. A method of exchanging an O-ring seal in a selected one of a plurality of shock absorbing apparatuses, said apparatuses being coupled to a body and each apparatus comprising a cylinder and a piston, each said cylinder being coupled to the body and each said piston being coupled to associated wheels and including an O-ring seal disposed therearound, with a fluid containment space being provided between each cylinder and piston for reducing shock forces transferred from the wheels to the body, said method comprising the steps of:

filling gas into the fluid containment space of at least one of said plurality of shock absorbing apparatuses other than the selected shock absorbing apparatus to cause relative movement of the piston and cylinder of said at least one shock absorbing apparatus, thereby lifting a portion of the body in order to extend the selected shock absorbing apparatus and expose said seal thereof;
   removing the exposed seal;
   disconnecting the piston of said selected shock absorbing apparatus from its associated wheels;
   lifting said disconnected piston away from its associated wheels;
   from beneath the lifted piston, installing a new O-ring seal thereon; and
   placing said installed seal at a predetermined position on the lifted piston.

2. A method according to claim 1, further including the step of purging the gas filled in said at least one of the shock absorbing apparatuses other than the selected shock absorbing apparatus after said placing step.

3. A method according to claim 1, wherein said gas is air.

4. A method according to claim 1, wherein said gas is inorganic gas.

5. A method according to claim 1, wherein said body is an airplane comprising a fuselage and wings.

* * * * *